(12) United States Patent
Hintennach

(10) Patent No.: US 10,290,846 B2
(45) Date of Patent: May 14, 2019

(54) SEPARATOR FOR AN ELECTROCHEMICAL STORAGE SYSTEM, METHOD FOR THE PRODUCTION OF AN ELECTRODE MATERIAL AND ELECTROCHEMICAL ENERGY STORAGE SYSTEM

(71) Applicant: Daimler AG, Stuttgart (DE)

(72) Inventor: Andreas Hintennach, Tamm (DE)

(73) Assignee: Daimler AG, Stuttgart (DE)

( * ) Notice: Subject to any disclaimer, the term of this patent is extended or adjusted under 35 U.S.C. 154(b) by 80 days.

(21) Appl. No.: 15/317,668

(22) PCT Filed: May 19, 2015

(86) PCT No.: PCT/EP2015/001019
§ 371 (c)(1),
(2) Date: Dec. 9, 2016

(87) PCT Pub. No.: WO2015/188913
PCT Pub. Date: Dec. 17, 2015

(65) Prior Publication Data
US 2017/0117522 A1    Apr. 27, 2017

(30) Foreign Application Priority Data

Jun. 12, 2014  (DE) .................. 10 2014 008 742

(51) Int. Cl.
*H01M 2/14* (2006.01)
*H01M 2/16* (2006.01)
(Continued)

(52) U.S. Cl.
CPC ......... *H01M 2/1613* (2013.01); *H01M 2/145* (2013.01); *H01M 4/5815* (2013.01);
(Continued)

(58) Field of Classification Search
CPC ........ H01M 2/14; H01M 2/16; H01M 2/1606; H01M 2/1613
See application file for complete search history.

(56) References Cited

U.S. PATENT DOCUMENTS 3,877,995 A    4/1975  Levine et al.
3,915,743 A   10/1975  Lauck
(Continued)

FOREIGN PATENT DOCUMENTS

CN    1216163 A    5/1999
CN    1494173 A    5/2004
(Continued)

OTHER PUBLICATIONS

PCT/EP2015/001019, International Search Report dated Sep. 9, 2015 (Three (3) pages).
(Continued)

*Primary Examiner* — Matthew J Merkling
(74) *Attorney, Agent, or Firm* — Crowell & Moring LLP

(57) ABSTRACT

A separator for an electrochemical storage system, which is arrangeable between an anode and a cathode of the electrochemical storage system, is disclosed. The separator is formed from a semipermeable carrier material. The carrier material is formed from a fiberglass fleece where at least one surface side of the fiberglass fleece facing a cathode is modified in such a way that it is impermeable for an active material of the cathode. A method for the production of a separator is also disclosed.

7 Claims, 2 Drawing Sheets

(51) Int. Cl.
*H01M 4/38* (2006.01)
*H01M 4/58* (2010.01)
*H01M 10/052* (2010.01)
*H01M 10/0525* (2010.01)

(52) U.S. Cl.
CPC ........ *H01M 10/0525* (2013.01); *H01M 4/382* (2013.01); *H01M 10/052* (2013.01)

(56) References Cited

U.S. PATENT DOCUMENTS

| | | | |
|---|---|---|---|
| 6,071,651 | A | 6/2000 | Forte et al. |
| 6,511,774 | B1 | 1/2003 | Tsukuda et al. |
| 2002/0045102 | A1* | 4/2002 | Jung ........................ H01M 4/02 429/324 |
| 2004/0106037 | A1 | 6/2004 | Cho et al. |
| 2014/0038026 | A1 | 2/2014 | Hasenkox |
| 2014/0342214 | A1 | 11/2014 | Wegner et al. |
| 2015/0180000 | A1* | 6/2015 | Roumi ................ H01M 2/1673 429/50 |
| 2015/0249244 | A1 | 9/2015 | Thieme et al. |

FOREIGN PATENT DOCUMENTS

| | | |
|---|---|---|
| CN | 102153955 A | 8/2011 |
| CN | 103290672 A | 9/2013 |
| DE | 23 34 660 A1 | 1/1975 |
| DE | 697 09 171 T2 | 6/2002 |
| DE | 10 2010 018 731 A1 | 11/2011 |
| DE | 10 2011 088 910 A1 | 6/2013 |
| DE | 10 2012 213 528 A1 | 2/2014 |
| DE | 10 2012 018 621 A1 | 4/2014 |
| EP | 0 949 705 A2 | 10/1999 |
| JP | 49-93405 A | 9/1974 |
| JP | 50-97394 A | 8/1975 |
| JP | 63-93467 A | 4/1988 |
| JP | 2004-158453 A | 6/2004 |
| WO | WO 98/32184 A1 | 7/1998 |
| WO | WO 2013/180073 A1 | 12/2013 |

OTHER PUBLICATIONS

U.S. Patent Application, "Electrochemical Energy Storage System and Battery", filed Dec. 9, 2016, Inventor: Andreas Hintennach.

Rao B. M. L. et al., "Effect of Sulfur Impurities on Li/TiS2 Cells", Extended Abstracts, vol. 80-2, Hollywood, Florida Oct. 5-10, 1980, XP001286722. 3 total pages.

Japanese Office Action issued in Japanese counterpart application No. 2016-572306 dated Dec. 5, 2017, with partial English translation (Five (5) pages).

Chinese Office Action issued in Chinese counterpart application No. 201580030927.2 dated Jun. 27, 2018, with partial English translation (Eight (8) pages).

* cited by examiner

SEPARATOR FOR AN ELECTROCHEMICAL STORAGE SYSTEM, METHOD FOR THE PRODUCTION OF AN ELECTRODE MATERIAL AND ELECTROCHEMICAL ENERGY STORAGE SYSTEM

BACKGROUND AND SUMMARY OF THE INVENTION

The invention relates to a separator for an electrochemical energy storage system. The invention also relates to a method for the production of a separator. The invention furthermore relates to an electrochemical energy storage system.

A lithium-sulphur battery is known from DE 10 2010 018 731 A1 which comprises a separator which comprises a non-woven fleece made from polymer fibers.

Furthermore, a resilient battery separating medium is known from DE 697 09 171 T2 which comprises a resilient, air laid fleece made from randomly orientated, entangled glass microfibers, wherein at least one part of the microfibers in the air laid fleece is further entangled in connection with the collection of microfibers to form the air laid, fibrous fleece in order to increase the tensile strength of the air laid, fibrous fleece; wherein the air laid, fibrous fleece has a mass of between approximately 50 and approximately 450 grams per square meter; wherein the microfibers have an average diameter of between approximately 1.0 and 2.0 micrometers; and the air laid, fibrous fleece has first and second main surfaces for contact with the main surfaces of the electrode plates of a battery in which the air laid, fibrous fleece is incorporated. Here, the separating medium has a clamping force which enables the separating medium to maintain contact with the electrode plates when repeated compressing and expansion is experienced in a direction perpendicular to the main surfaces of the air laid, fibrous fleece when the electrode plates expand and contract during the operating period of the battery.

The object of the invention is to specify a separator for an electrochemical energy storage system which is improved compared to the prior art, an improved method for the production of such a separator and an improved electrochemical energy storage system.

A separator for an electrochemical storage system is able to be arranged between an anode and a cathode of the electrochemical storage system, wherein the separator is formed from a semipermeable carrier material. It is provided according to the invention that the carrier material is formed from a fiberglass fleece, wherein at least one surface side of the fiberglass fleece is modified in such a way that it is impermeable for an active material of the cathode. Here, the active material of the cathode comprises sulphur compounds in particular.

When discharging the battery, sulphur compounds may arise which are potentially not completely converted into elemental sulphur during the charging process. A diffusion of these sulphur compounds to the anode are prevented or at least reduced by means of the impermeability of the separator. The sulphur compounds can form a lithium-sulphide layer on the anode, which considerably reduce the capacity and thus the life span of the battery. In addition, the active material embedded in the cathode, in particular sulphur, is gradually reduced. The separator formed in such a way thus increases the life span of the electrochemical storage system.

The fiberglass fleece is expediently permeable for an active material of the anode, wherein the active material of the anode comprises metal ions. The charging and discharging processes of the electrochemical storage system are thus ensured since the metal ions can be transported through the separator from the anode to the cathode and vice versa.

An electrolyte is thus arranged in the fiberglass fleece which, in a preferred embodiment variant, is an organic, liquid electrolyte. Alternatively, the electrolytes can also be solid-state electrolytes. The electrolyte ensures an ion exchange between the cathode and the anode.

A method according to the invention is provided for the production of the separator described above, the method comprising the following steps:

a) homogeneous wetting with concentrated acid on the surface of the fiberglass fleece at least on one surface side, b) thermal pressing of the fiberglass fleece wetted with acid, c) drying the pressed fiberglass fleece at a predetermined temperature, d) cleaning the dried fiberglass fleece with demineralized water, e) drying the cleaned fiberglass fleece using a vacuum, and f) pressing the dried fiberglass fleece and subsequent cooling of the pressed fiberglass fleece.

The method enables a surface modification of at least one surface side of the fiberglass fleece, such that it is impermeable on the modified surface side for the active material of the cathode, in particular for sulphur compounds such as polysulphides, but still permeable for the active material of the anode, for example lithium ions. This enables an improved performance of the electrochemical energy storage system compared to prior art since the cathodic active material still remains in the cathode and an accumulation of cathodic active material in the anode is avoided to the greatest extent possible.

According to a preferred exemplary embodiment, the fiberglass fleece is wetted with nitric acid according to step a). A semipermeable layer is formed on the wetted surface by wetting the fiberglass fleece with nitric acid, the layer being impermeable for sulphur compounds in particular.

In order to create a mechanically stable surface modification of the fiberglass fleece, the fiberglass fleece is pressed flat after wetting with acid according to step b) and after drying and cleaning according to step f). A permanent surface modification of the fiberglass fleece occurs through flattening, by means of which high performance and a long life span of the electrochemical energy storage system can be achieved.

The invention furthermore relates to an electrochemical energy storage system having at least one separator which is described above.

Exemplary embodiments of the invention are illustrated in greater detail below by means of drawings.

DETAILED DESCRIPTION OF THE DRAWINGS

Figure 1:
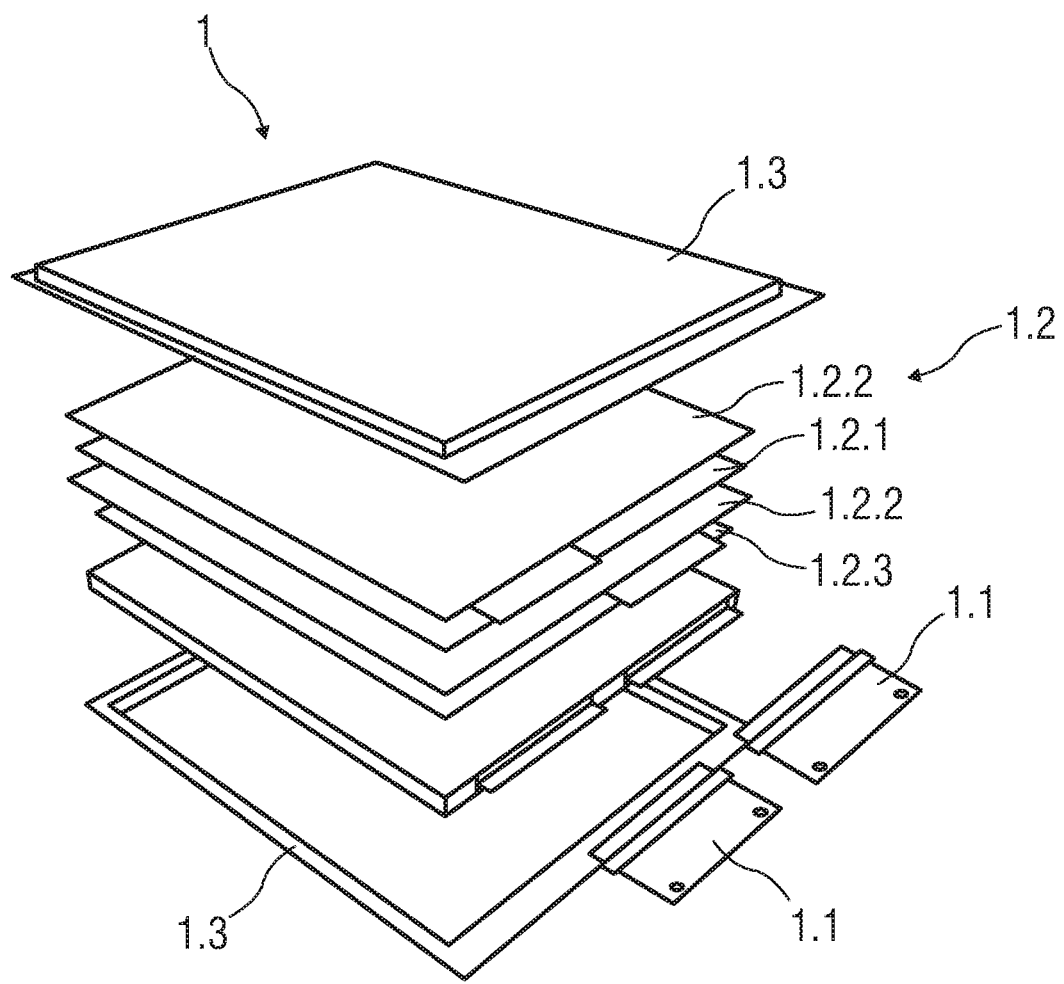
FIG. 1 schematically illustrates an exploded depiction of a single cell for a battery.

Parts that correspond to one another are provided with the same reference numerals in all figures.

In FIG. 1, a single cell 1 for a battery which is not depicted in more detail is shown. In particular, the battery is a rechargeable battery, for example a lithium-sulphur battery.

The single cell 1 is a so-called pouch or coffee bag cell, wherein a number of such single cells 1 are connected electrically in series and/or in parallel with one another to form the battery and wherein interconnection takes place via plate-like arresters 1.1 as electrical connections of the single cell 1.

Such a single cell 1 is implemented as a flat and as rectangular as possible storage system element for electrical energy which comprises an electrode foil arrangement 1.2 made from layers of several alternately stacked, foil-like anodes 1.2.1, separators 1.2.2 and cathodes 1.2.3 which is surrounded by a foil-like casing 1.3 which is formed from two shell-like foil sections. The anode 1.2.1 and the cathode 1.2.3 are referred to below as electrodes.

The electrodes of the single cell 1 are each formed from a substrate and are coated with an electrically conductive matrix in which an active material is contained in a defined manner. Here, the electrodes are formed as solid bodies, wherein the battery can preferably also be used for high temperature ranges and thus as a high-temperature battery.

The electrically conductive matrix for the cathode 1.2.3 is formed from an electrically conductive carbon structure such as, for example, graphite or carbon black, which is preferably formed to be porous and mechanically flexible. The electrically conductive matrix for the anode 1.2.1 is formed from an electrically conductive carbon structure and a silicon structure since silicon has a less favorable level of electrical conductivity than carbon but can bind a larger quantity of active material.

The active material can be bound in the electrically conductive matrix homogeneously over the complete electrode. The active material serves for a chemical reaction taking place between the anode 1.2.1 and the cathode 1.2.3, in particular when charging and discharging the battery. If the battery is formed as a lithium-sulphur battery, then the active material is, for example, sulphur for the cathode 1.2.3 and lithium or a lithium alloy for the anode 1.2.1.

When discharging the battery, the lithium intercalated in the anode 1.2.1 is oxidized into lithium ions and electrons. The lithium ions travel through the separator 1.2.2 to the cathode 1.2.3, while at the same time the electrons are transferred via an outer circuit from the anode 1.2.1 to the cathode 1.2.3, wherein an energy consumer can be interconnected between the cathode 1.2.3 and the anode 1.2.1 which is supplied with energy by the electron flow. At the cathode 1.2.3, the lithium ions are absorbed by a reduction reaction, wherein sulphur is reduced to lithium sulphide.

The electrochemical reaction when discharging a battery is generally known and can, with the example of a lithium-sulphur battery, be described as follows:

$$Li \rightarrow Li^+ + e^-; \quad \text{Anode 1.2.1:}$$

$$S_8 + 2Li^+ + e^- \rightarrow Li_2S_8 \rightarrow Li_2S_6 \rightarrow Li_2S_4 \rightarrow Li_2S_2 \rightarrow Li_2S \quad \text{Cathode 1.2.3:}$$

When charging the battery, an energy source is connected to the electrodes. The lithium is thus oxidized from lithium sulphide to lithium cations, wherein the lithium cations travel via the separator 1.2.2 and the electrons via the outer circuit back to the anode 1.2.1.

In order to enable ion transport of the active material of the anode between the anode 1.2.1 and the cathode 1.2.1, the separator 1.2.2 is formed to be permeable for the active material of the anode 1.2.1, i.e., for lithium ions, for example.

The invention provides that the separator 1.2.2 is also impermeable for sulphur compounds, i.e., sulphide anions and polysulphide anions, which can arise when discharging the battery and which are potentially not completely converted into elemental sulphur during the charging process. This prevents or minimizes at least the transport of such poorly soluble sulphur compounds to the anode 1.2.1, which considerably reduce the capacity and thus the life span of the battery. In addition, the active material embedded in the electrically conductive matrix of the cathode 1.2.3 is gradually reduced through the transport of sulphur compounds to the anode 1.2.1.

In order to implement such semipermeability, the invention provides a separator 1.2.2 which is formed from a fiberglass fleece 1.2.2.1 having an organic, liquid electrolyte arranged therein, for example, wherein the fiberglass fleece 1.2.2.1 has at least one modified surface side which is impermeable for sulphur compounds.

Figure 2:
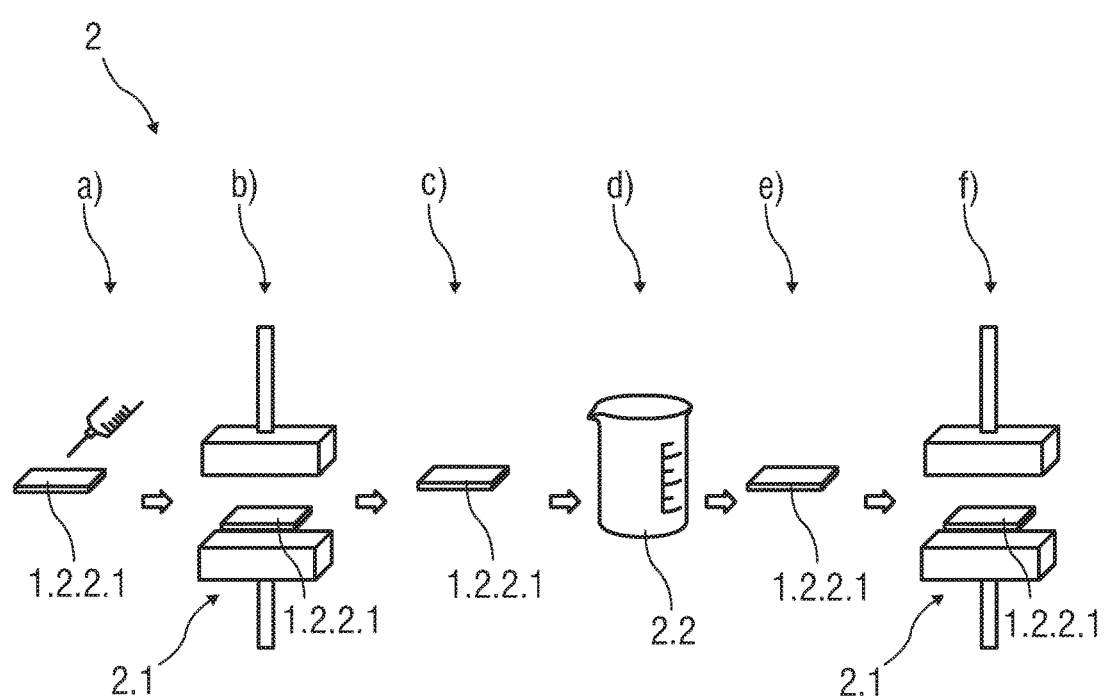
FIG. 2 schematically illustrates a process sequence for the production of a separator for the single cell having components of a device for the production of the separator in a perspective view.

For this purpose, FIG. 2 shows a device 2 for the production of such a separator 1.2.2 in a perspective view in the scope of a process sequence.

The device 2 comprises a pressing device 2.1 which is formed from two stamp-like pressing elements, between which the fiberglass fleece 1.2.2.1 is arranged in order to press this flat. The device 2 also comprises a container 2.2, into which demineralized water is poured. The device 2 furthermore comprises a vacuum device which is not depicted.

In a first step a), the fiberglass fleece 1.2.2.1 is wetted on the surface and as homogeneously as possible with concentrated acid, for example nitric acid. This takes place, for example, by pressing the fiberglass fleece 1.2.2.1 onto a further fleece completely soaked in acid, which is not depicted. The fiberglass fleece 1.2.2.1 can thus be wetted with acid on one surface side or on both surface sides.

In a second step b), the fiberglass fleece 1.2.2.1 wetted with acid is pressed flat by means of the pressing device 2.1 at a predetermined temperature, for example in the range between 80 degrees Celsius and 120 degrees Celsius. For this purpose, the fiberglass fleece 1.2.2.1 is arranged between the pressing elements and is pressed flat with a predetermined force, for example between 20 kg cm−2 and 60 kg cm−2. The pressing elements themselves are thus formed to be able to be heated, such that the fiberglass fleece 1.2.2.1 can be heated to the predetermined temperature during pressing.

In a third step c), the thermally pressed fiberglass fleece 1.2.2.1 is completely dried at a predetermined temperature, in particular at a temperature of >100 degrees Celsius.

In a fourth step d), the completely dried fiberglass fleece 1.2.2.1 is cleaned with the demineralized water which is poured into the container 2.2. Here, the depicted container 2.2 only represents an exemplary retention of the demineralized water. In the scope of the invention, all other types of retention of the demineralized water can also be possible.

In a fifth step e), the cleaned fiberglass fleece 1.2.2.1 is cleaned using a vacuum. This means that a so-called vacuum drying of the cleaned fiberglass fleece 1.2.2.1 takes place. The vacuum drying can take place, for example, by means of a vacuum drying oven.

In a sixth step f), the fiberglass fleece 1.2.2.1 dried by vacuum is thermally pressed flat again for a predetermined period of time, wherein the force and temperature during flattening are both slightly increased compared to the second step b). The thermally pressed fiberglass fleece 1.2.2.1 is then completely cooled.

The invention claimed is:

1. A method for production of a separator, wherein the separator comprises:
 a semipermeable carrier material;
 wherein the separator is disposable between an anode and a cathode of the electrochemical storage system;
 wherein the semipermeable carrier material is formed from a fiberglass fleece and wherein a surface side of the fiberglass fleece is modified such that the surface side is impermeable for an active material of the cathode;
 and comprising the steps of:
 a) homogeneous wetting with concentrated acid on the surface side of the fiberglass fleece;
 b) thermal pressing of the fiberglass fleece wetted with the concentrated acid;
 c) drying the thermally pressed fiberglass fleece at a predetermined temperature;
 d) cleaning the dried fiberglass fleece with demineralized water;
 e) drying the cleaned fiberglass fleece using a vacuum; and
 f) pressing the dried fiberglass fleece and subsequent cooling of the pressed dried fiberglass fleece.

2. The method according to claim 1, wherein the surface side is impermeable for sulphur compounds.

3. The method according to claim 1, wherein the fiberglass fleece is permeable for an active material of the anode and wherein the active material of the anode comprises metal ions.

4. The method according to claim 1, wherein the concentrated acid is nitric acid.

5. The method according to claim 1, wherein the fiberglass fleece is pressed flat according to steps b) and f).

6. The method according to claim 1, wherein the fiberglass fleece has an electrolyte disposed therein.

7. The method according to claim 6, wherein the electrolyte is an organic, liquid electrolyte.

* * * * *